United States Patent
Takeshima

(10) Patent No.: US 8,435,486 B2
(45) Date of Patent: May 7, 2013

(54) REDOX MATERIAL FOR THERMOCHEMICAL WATER SPLITTING, AND METHOD FOR PRODUCING HYDROGEN

(75) Inventor: Shinichi Takeshima, Numazu (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/785,938

(22) Filed: May 24, 2010

(65) Prior Publication Data

US 2011/0300064 A1    Dec. 8, 2011

(51) Int. Cl.
C01B 3/08    (2006.01)
B01J 21/00    (2006.01)
B01J 23/00    (2006.01)
B01J 23/10    (2006.01)

(52) U.S. Cl.
USPC ............ 423/657; 502/240; 502/300; 502/302

(58) Field of Classification Search .......... 502/240–355; 423/657
See application file for complete search history.

(56) References Cited

U.S. PATENT DOCUMENTS

| | | | | |
|---|---|---|---|---|
| 5,185,311 | A * | 2/1993 | Tabata et al. ................. | 502/304 |
| 5,380,692 | A * | 1/1995 | Nakatsuji et al. ............. | 502/303 |
| 6,576,588 | B2 * | 6/2003 | Ryu et al. ..................... | 502/331 |
| 2006/0166816 | A1 * | 7/2006 | Zhang et al. .................. | 502/240 |
| 2009/0286677 | A1 * | 11/2009 | Takeshima et al. ........... | 502/241 |

FOREIGN PATENT DOCUMENTS

| | | |
|---|---|---|
| JP | A-7-267601 | 10/1995 |
| JP | A-2001-270701 | 10/2001 |
| JP | A2008-012382 | 1/2008 |
| JP | A2008-094636 | 4/2008 |
| WO | WO 2008004687 A1 * | 1/2008 |

OTHER PUBLICATIONS

Nocera et al., "Heterogenous photocatalyst materials for water splitting", Chemical Society Reviews, 2009, 38, 253-278.*
Abe et al., "Photocatalytic Activity of R3MO7 and R2Ti2O7 (R = Y, Gd, La; M = Nb, Ta) for Water Splitting into H2 and O2", J. Phys. Chem. B. 2006, 110, 2219-2226.*
Nov. 1, 2011 PCT International Search Report issued in PCT/JP2011/068404 (with partial English Translation).
Nov. 1, 2011 PCT Written Opinion issued in PCT/JP2011/068404 (with partial English Translation).
Kaneko et al., "Reactive ceramics of CeO$_2$-MO$_x$ (M = Mn, Fe, Ni, Cu) for H$_2$ generation by two-step water splitting using concentrated solar thermal energy," Energy, vol. 32, 2007, pp. 656-663.

* cited by examiner

Primary Examiner — Anthony J. Zimmer
(74) Attorney, Agent, or Firm — Oliff & Berridge, PLC

(57) ABSTRACT

An improved redox material able to be used for thermochemical water splitting, and a method for producing hydrogen using this redox material are provided. The redox material for thermochemical water splitting comprises a redox metal oxide selected from the group comprising perovskite-type composite metal oxides, fluorite-type composite metal oxides and combinations thereof, and a metal oxide carrier. The redox metal oxide is carried on the metal oxide carrier in a dispersed state. The method for producing hydrogen uses the oxidation and reduction of the redox material to decompose water into hydrogen and oxygen.

8 Claims, 1 Drawing Sheet

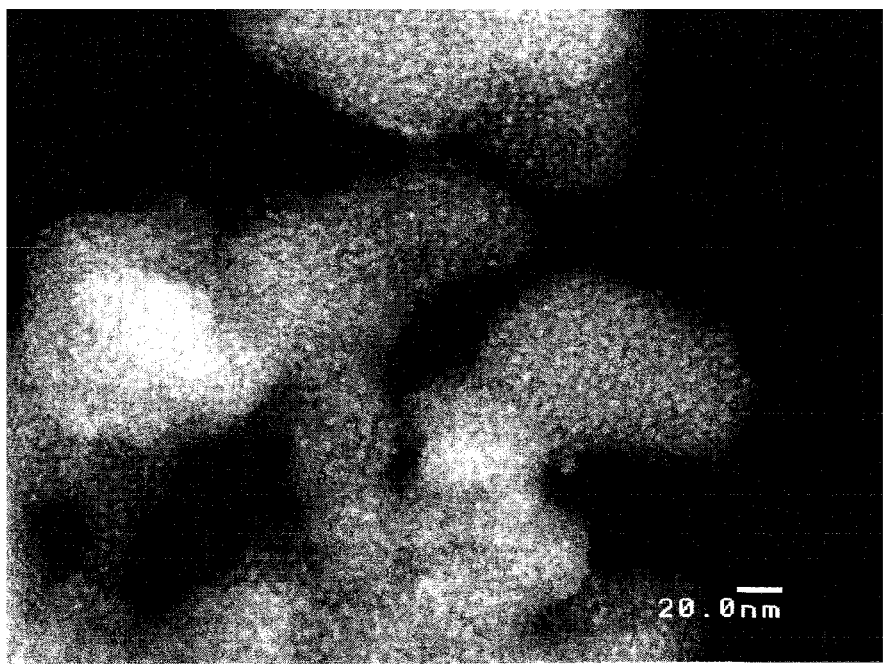

REDOX MATERIAL FOR THERMOCHEMICAL WATER SPLITTING, AND METHOD FOR PRODUCING HYDROGEN

FIELD OF THE INVENTION

The present invention relates to a redox material for thermochemical water splitting.

DESCRIPTION OF THE RELATED ART

In recent years, numerous proposals have been made for the use of the clean energy of hydrogen as an energy source. To produce hydrogen, steam reformation using a hydrocarbon fuel is the general practice. Further, in recent years, obtaining hydrogen from water by water splitting, in particular by thermochemical water splitting, has also been considered.

"Thermochemical water splitting" is the method of combining chemical reactions to cause the decomposition of water at a temperature lower than the case of direct heat decomposition of water.

Specifically, for example, in thermochemical water splitting, oxidation and reduction reactions between metal oxides differing in oxidation states are used to break down water into hydrogen and oxygen in the following way (MO means "Metal Oxide"):

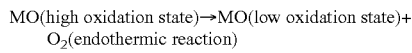

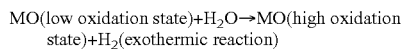

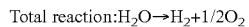

In such thermochemical water splitting, it is becoming important to lower the temperature required for the reaction, in particular to lower the temperature required for the reaction breaking down high oxidation-state metal oxides into low oxidation-state metal oxides and oxygen.

In relation to this, for example, "Reactive ceramics of $CeO_2$-$MO_x$ (M=Mn, Fe, Ni, Cu) for $H_2$ generation by two-step water splitting using concentrated solar thermal energy", H. Kaneko et al., Energy, Volume 32, Issue 5, May 2007, pp. 656-663, describes that $CeO_2$-$MO_x$ ($MO_x$=MnO, $Fe_2O_3$, NiO, CuO) and other composite metal oxides having a fluorite structure may be used well for thermochemical water splitting. Specifically, this document describes that when using such composite metal oxides, it is possible to reduce a high oxidation-state metal oxide to a low oxidation-state metal oxide at the temperature of around 1500° C.

Further, Japanese Unexamined Patent Publication (A) No. 2008-94636 describes using a heating rate greater than 80° C./min to efficiently reduce high oxidation-state metal oxides to low oxidation-state metal oxides at a relatively low temperature. Specifically, this document describes that, by using such a large heating rate, it is possible to efficiently reduce a high oxidation-state metal oxides to a low oxidation-state metal oxides at the temperature of around 1500° C.

Incidentally, in the field of exhaust gas purification of automobiles, etc., as a porous metal oxide carrier for carrying the precious metals or other catalyst ingredient, it is known to use alumina, porous silica, etc.

For example, the exhaust gas purification catalyst proposed by the present inventors in Japanese Unexamined Patent Publication (A) No. 2008-12382 (corresponding to U.S. Patent Application Publication No. US2009/286677A1) comprises a porous silica carrier comprised of silica having an internal pore structure, and particles of perovskite-type composite metal oxide carried in the internal pore structure of the porous silica carrier. The porous silica carrier has a pore distribution with a peak derived from gaps of 3 to 100 nm between silica primary particles.

SUMMARY OF THE INVENTION

The present invention provides an improved redox material for thermochemical water splitting which can be used for thermochemical water splitting, in particular an improved redox material for thermochemical water splitting which can be used for thermochemical water splitting at a relatively low temperature.

The redox material for thermochemical water splitting of the present invention comprises a redox metal oxide selected from the group consisting of perovskite-type composite metal oxides, fluorite-type composite metal oxides, and combinations thereof; and a metal oxide carrier. The redox metal oxide is carried on the metal oxide carrier in a dispersed state. Note that, in the present invention, the "internal pore structure" of the silica means the regularly arrayed pores of a molecular level, formed by the silicon atoms and oxygen atoms forming the silica.

Further, the present invention provides a method for producing hydrogen by splitting water with use of a redox material for thermochemical water splitting of the present invention. This method for producing hydrogen by thermochemical water splitting comprises (a) heating a redox material of the present invention comprising a high oxidation-state redox metal oxide to remove oxygen from the high oxidation-state redox metal oxide, and thereby obtain a redox material comprising a low oxidation-state redox metal oxide, and oxygen; and (b) bringing the redox material comprising the low oxidation-state redox metal oxide into contact with water to oxidize the low oxidation-state redox metal oxide and reduce the water, and thereby obtain the redox material comprising the high oxidation-state redox metal oxide, and hydrogen.

BRIEF DESCRIPTION OF THE DRAWINGS

FIG. 1 is an HAADF-STEM image of the redox material obtained in Example 3.

DESCRIPTION OF THE PREFERRED EMBODIMENTS

Redox Material for Thermochemical Water Splitting

The redox material for thermochemical water splitting of the present invention comprises a redox metal oxide selected from the group comprising perovskite-type composite metal oxides, fluorite-type composite metal oxides, and combinations thereof, and a metal oxide carrier. The redox metal oxide is carried on the metal oxide carrier in a dispersed state. Note that, in the present invention, the metal oxides to be oxidized and reduced for thermochemical water splitting will be referred to as "redox oxides".

In the redox material for thermochemical water splitting of the present invention, perovskite-type composite metal oxide or other redox metal oxide is carried on the metal oxide carrier in a dispersed state. Due to this, compared with the case where the redox metal oxide is present alone, the particle size of the redox metal oxide can be kept small. Such a relatively small particle size unexpectedly enables the oxidation and reduction reactions of the redox metal oxide for thermochemical water splitting at a relatively low temperature, in particular the reduction reaction from a high oxidation-state redox metal oxide to a low oxidation-state redox metal oxide.

While not theoretically limited, with a redox metal oxide having a relatively small particle size, the surface energy thereof is large. Therefore, when heating such a high oxidation-state redox metal oxide, the oxygen easily becomes unstable. It is believed that, even at a relatively low temperature, such a high oxidation-state redox metal oxide is reduced to a low oxidation-state redox metal oxide.

This redox material of the present invention may not only be used shaped alone, but may also be used by coating it on a monolithic substrate, for example on a ceramic honeycomb.

Metal Oxide Carrier

As the metal oxide carrier for carrying the redox metal oxide, any metal oxide carrier may be used. However, the metal oxide carrier is preferably a carrier which can carry the redox metal oxide with a highly dispersed state.

As such a metal oxide carrier, it is possible to use a porous silica carrier comprised of silica having an internal pore structure, and to carry the redox metal oxide in the internal pore structure of the porous silica carrier. In this case, the redox metal oxide is anchored in the internal pore structure of the porous silica carrier, whereby, even at a high temperature, movement and sintering of the redox metal oxide, and thereby increase in particle size of the redox metal oxide can be suppressed. In relation to this, for example, the peak derived from the internal pore structure of silica may be in the range of 1 to 5 nm in the pore distribution of the porous silica carrier.

In particular, as such a porous silica carrier, it is possible to use a porous silica carrier with a pore distribution wherein the peak derived from the gaps between primary particles of silica is in the range of 3 to 100 nm, in particular 5 to 50 nm.

In this way, if the peaks derived from the gaps between primary particles of the silica is in the above range in the pore distribution of the porous silica carrier having the internal pore structure, that is, if the porous silica carrier has relatively small primary particles, it is believed that the porous silica carrier enhances the contact between the redox metal oxide carried in the internal pore structure of the porous silica carrier and the atmosphere, and thereby promotes the oxidation and reduction of the redox oxides.

Such a porous silica carrier, for example, can be obtained by causing an alkylamine to self-assemble in an aqueous solvent, adding alkoxysilane and an optional base to this solution to use the self-assembled alkylamine as a template and cause precipitation of the porous silica carrier precursor around self-assembled alkylamine, and firing the precipitate.

Therefore, for example, in this method, it is possible to use an ethanol aqueous solution as the aqueous solvent, hexadecylamine as the alkylamine, tetraethoxysilane as the alkoxysilane, and ammonia as the optional base.

The alkylamine and alkoxysilane used in the method for producing a porous silica carrier can be selected depending on the intended primary particle size, pore distribution, etc. of the porous silica carrier.

For example, by making the length of the alkyl chain of the alkylamine used in the production of the porous silica carrier longer, it is possible to obtain a larger pore size of the internal pore structure.

Specifically, by using, as the alkylamine, cetyl (that is, $C_{16}H_{33}$) trimethyl ammonium chloride, it is possible to make the pore size of the internal pore structure about 2.7 nm. By using lauryl (that is, $C_{12}H_{25}$) trimethyl ammonium chloride, it is possible to make the pore size of the internal pore structure about 2.0 nm. By using tetracosyl (that is, $C_{24}H_{49}$) trimethyl ammonium chloride, it is possible to make the pore size of the internal pore structure about 4.0 nm.

Redox Metal Oxide

The redox metal oxide used in the redox material of the present invention is perovskite-type composite metal oxides, fluorite-type composite metal oxides, or combinations thereof.

The redox metal oxide has an average particle size of 20 nm or less, 15 nm or less, 10 nm or less, or 5 nm or less, for example, an average particle size of 1.5 nm to 5 nm, and may be carried on the metal oxide carrier in a dispersed state.

Further, the amount of the redox metal oxide carried on the metal oxide carrier can be selected in a range suppressing the particle growth of the redox metal oxide and enabling provision of sufficient performance with regard to thermochemical water splitting. Therefore, for example, the amount of the redox metal oxide carried can be 0.01 mol/100 g or more, or 0.05 mol/100 g or more to 100 mol/100 g or less, 10 mol/100 g or less, 1 mol/100 g less, or 0.5 mol/100 g or less, with regard to a number of moles of transition metal in the redox metal oxide on the basis of the mass of the metal oxide carrier carrying the redox metal oxide.

Specifically, the perovskite-type composite metal oxide may be a composite metal oxide of a rare earth and/or a transition metal selected from strontium Sr, barium Ba, calcium Ca. In this case, it is believed that the perovskite-type composite metal oxide functions as a redox metal oxide due to the change in the oxidation number of the transition metal. More specifically, the perovskite-type composite metal oxide may be perovskite-type composite metal oxides of the following formula:

(where, A is a rare earth element, in particular one selected from the group consisting of lanthanum La and celium Ce, an alkaline earth metal selected from strontium Sr, barium Ba, calcium Ca, or a combination thereof;

B is a transition metal element, in particular one selected from the group consisting of cobalt Co, iron Fe, nickel Ni, chromium Cr, manganese Mn, and combinations thereof;

O is oxygen;

a+b=2; and a:b=1.2:0.8 to 0.8:1.2, in particular 1.1:0.9 to 0.9:1.1).

That is, for example, the perovskite-type composite metal oxides may be composite metal oxides of the following formulas (x=0.1 to 0.4):

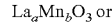

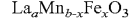

A perovskite-type composite metal oxide containing, along with a rare earth metal such as lanthanum, a transition metal of manganese, and iron partially substituting manganese can be oxidized and reduced efficiently at a relatively low temperature, and therefore is particularly preferable in terms of thermochemical water splitting characteristic.

Further, specifically, the fluorite-type composite metal oxide may be a composite metal oxide of a rare earth and transition metal selected from strontium Sr, barium Ba, calcium Ca. In this case, it is believed that the fluorite-type composite metal oxide functions as a redox metal oxide due to the change in the oxidation number of the transition metal. More specifically, the fluorite-type composite metal oxides may be fluorite-type composite metal oxides of the following formula:

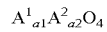

(where $A^1$ is a rare earth element, in particular, one selected from the group consisting of lanthanum La and celium Ce, an alkaline earth metal selected from strontium Sr, barium Ba, calcium Ca, or a combination thereof;

$A^2$ is a transition metal element, in particular, one selected from the group consisting of cobalt Co, iron Fe, nickel Ni, chromium Cr, manganese Mn, and combinations thereof;

O is oxygen;

a1+a2=2; and a1:a2=1.3:0.7 to 0.7:1.3, particularly 1.2:0.8 to 0.8:1.2, more particularly 1.1:0.9 to 0.9:1.1).

That is, for example, the fluorite-type composite metal oxide may be a composite metal oxide of the following formulas (wherein x=0.1 to 0.4, and δ is the amount of reduction of oxygen due to oxygen defects):

$$Ce_{a1}Mn_{a2}O_4 \text{ or}$$

$$Ce_aMn_{b-x}Fe_xO_{4-\delta}$$

Here, fluorite-type composite metal oxide containing, along with a rare earth metal such as cerium, a transition metal of manganese, and iron partially substituting manganese can be oxidized and reduced efficiently at a relatively low temperature, and therefore is particularly preferable in terms of thermochemical water splitting characteristic.

A redox metal oxide can be carried on a metal oxide carrier by impregnating a solution of salts of the metals forming the redox metal oxide into the metal oxide carrier, and drying and firing the obtained metal oxide carrier. As the salts of the metals forming the redox metal oxide, inorganic acid salts such as nitrate and chlorate, or organic acid salts such as an acetate may be mentioned.

The removal and drying of solvent from a salt solution may be achieved by any method and at any temperature. This, for example, can be achieved by placing a metal oxide carrier impregnated with the salt solution in an oven at 120° C. The metal oxide carrier from which the solvent is removed and dried in this way may be fired to obtain the redox material of the present invention. This firing may be performed at the temperature generally used in formation of metal oxides, for example, at a temperature of 500 to 1100° C.

Note that, regarding such a porous silica carrier, and a method for carrying a redox metal oxide onto such a porous silica carrier, Japanese Unexamined Patent Publication (A) No. 2008-12382 (corresponding to U.S. Patent Application Publication No. US2009/286677A1) can be referred. The descriptions of this patent document and other documents cited in this specification are incorporated in this specification by reference.

Method for Producing Hydrogen of Present Invention

In the method for producing hydrogen of the present invention, hydrogen is produced by thermochemical water splitting with use of the redox material of the present invention. Specifically, the method of the present invention for producing hydrogen by thermochemical water splitting comprises (a) heating a redox material comprising a high oxidation-state redox metal oxide to remove oxygen from the high oxidation-state redox metal oxide, and thereby obtain a redox material comprising a low oxidation-state redox metal oxide, and oxygen, and (b) bringing the redox material comprising the low oxidation-state redox metal oxide into contact with water to oxidize the low oxidation-state redox metal oxide and reduce the water, and thereby obtain the redox material comprising the high oxidation-state redox metal oxide, and hydrogen.

Further, in the method for producing hydrogen of the present invention, by using the redox material of the present invention, it is possible to remove oxygen from the high oxidation-state redox metal oxide at a relatively low temperature. This, for example, can be achieved by heating the redox metal oxide at a temperature of 1300° C. or less, 1200° C. or less, 1100° C. or less, or 1000° C. or less. This heating can be performed in an inert atmosphere, in particular a nitrogen atmosphere, or a rare gas atmosphere such as an argon atmosphere to promote removal of oxygen.

In the method for producing hydrogen of the present invention, by using the redox material of the present invention, it is possible to react low oxidation-state redox metal oxide with water at a relatively low temperature to generate hydrogen. This, for example, can be achieved by heating the redox metal oxide at a temperature of 1100° C. or less, 1000° C. or less, 900° C. or less, or 800° C. or less.

Below, the present invention will be further explained based on examples, but the present invention is not limited thereto.

EXAMPLES

Examples 1 to 5

Formation of Porous Silica Carrier

The porous silica of the metal oxide carrier was formed as follows:

Cetyl trimethyl ammonium chloride was dissolved in water in an amount of 0.5 mol/L. The obtained aqueous solution was stirred for 2 hours to cause the cetyl trimethyl ammonium chloride to self-assemble. Next, tetraethoxysilane and ammonia water were added to the self-assembled cetyl trimethyl ammonium chloride solution to make the solution a pH9.5.

In this solution, tetraethoxysilane was hydrolyzed over 30 hours to cause silica to precipitate around the assembled cetyl trimethyl ammonium chloride, and form secondary particles comprised of primary particles having nanosize pores. Next, a small amount of nitric acid was added to this aqueous solution to make it a pH7, and the secondary particles were made to further agglomerate and aged over 1 hour to obtain a porous silica carrier precursor.

After this, the obtained porous silica carrier precursor was washed with an ethanol aqueous solution, filtered, dried, and fired at 800° C. in the air for 2 hours to obtain the porous silica carrier used in the present invention. Note that, the size of the pores derived from the internal pore structure of silica in the obtained porous silica carrier was about 2.7 nm. Further, the obtained porous silica carrier not only had pores derived from the internal pore structure of silica, but also pores of over 10 nm size derived from the gaps between the primary particles of silica.

Carrying of Redox Metal Oxide

As redox metal oxide, perovskite-type $LaMnO_3$ (Examples 1), perovskite-type $LaMn_{0.8}Fe_{0.2}O_3$ (Examples 2), perovskite-type $CeFeO_3$ (Examples 3), fluorite structure-type $CeMnO_4$ (Examples 4), and fluorite structure-type $CeMn_{0.8}Fe_{0.2}O_{4-\delta}$ (Examples 5) were carried on the porous silica carriers. They were carried in a manner wherein the number of moles of the transition metal in the redox metal oxide is 0.12 mol/100 g-carrier, and the number of moles of all metals in the redox metal oxide is 0.24 mol/100 g-carrier. Further, the redox metal oxides were absorptively carried on the porous silica carriers in a manner generally used for automobile catalysts.

Specifically, for Example 1, about 0.5 mol/L of lanthanum nitrate, about 0.5 mol/L of manganese nitrate, and about 1.2 mol/L of citric acid as a stabilizing agent were added to distilled water to obtain a solution. This solution was stored for 2 hours. After this, the porous silica carrier in a dried state was added to this solution, and ultrasonic waves are applied thereto while stirring until bubbles were no longer produced from the porous silica carrier.

The porous silica carrier carrying the absorbed solution was filtered to separate it from the solution, and then dried at 250° C. and fired at 800° C. for 2 hours to obtain a porous silica carrier carrying redox metal oxide comprised of perovskite type lanthanum-manganese composite metal oxides. The amounts of lanthanum and manganese carried were respectively 0.12 mol/100 g-carrier.

Comparative Examples 1 and 2

Redox metal oxide comprised of $Ce_{0.9}Fe_{0.1}O_{1.5}$ (Comparative Example 1) composite metal oxides, and fluorite-type $Ce_{0.9}Mn_{0.1}O_2$ (Comparative Example 2) composite metal oxides were obtained by coprecipitation. The obtained redox metals oxide were in the form of particles having a particle size of about 2 to 3 nm.

These redox metal oxide were treated, in the same way as in Example 1, for an oxygen removal reaction and hydrogen generation reaction. However, in Comparative Examples 1 and 2, when the oxygen removal reaction was performed at 1000° C., and the hydrogen generation reaction was performed at 800° C., the reactions did not proceed to an observable extent. Therefore, the oxygen removal reaction was performed at 1400° C., and the hydrogen generation reaction was performed at 1000° C. The obtained results are shown in Table 1.

TABLE 1

Results of Evaluation

| | Redox metal oxide | | Oxygen removal | | Hydrogen generation | |
|---|---|---|---|---|---|---|
| | Composition | Form | Temp. (° C.) | Amount of removal (μmol/g) | Temp. (° C.) | Amount of generation (μmol/g) |
| Ex. 1 | $LaMnO_3$ (perovskite type) | Carried on carrier (0.24 mol/100 g-carrier) | 800 | 100.4 | 800 | 156.5 |
| Ex. 2 | $LaMn_{0.8}Fe_{0.2}O_3$ (perovskite type) | Carried on carrier (0.24 mol/100 g-carrier) | 800 | 122.2 | 800 | 184.7 |
| Ex. 3 | $CeFeO_3$ (perovskite type) | Carried on carrier (0.24 mol/100 g-carrier) | 800 | 32.3 | 800 | 56.5 |
| Ex. 4 | $CeMnO_4$ (fluorite type) | Carried on carrier (0.24 mol/100 g-carrier) | 800 | 128.0 | 800 | 136.7 |
| Ex. 5 | $CeMn_{0.8}Fe_{0.2}O_{4-\delta}$ (fluorite type) | Carried on carrier (0.24 mol/100 g-carrier) | 800 | 105.3 | 800 | 165.6 |
| Comp. Ex. 1 | $Ce_{0.9}Fe_{0.1}O_{1.5}$ | Particle | 1400 | 83.0 | 1000 | 35.2 |
| Comp. Ex. 2 | $Ce_{0.9}Mn_{0.1}O_2$ (fluorite type) | Particle | 1400 | 69.0 | 1000 | 52.2 |

Evaluation of Carried State of Redox Metal Oxide

A HAADF-STEM image of the redox material of Example 3 obtained by carrying a perovskite-type composite metal oxide on a porous silica carrier is shown in FIG. 1. In the HAADF-STEM image of FIG. 1, the portions corresponding to the internal pore structures of the porous silica carrier are shown white. Therefore, it is understood that the redox metal oxide comprised of the perovskite-type composite metal oxide was carried in the internal pore structure of the porous silica carrier. Further, from the HAADF-STEM image of FIG. 1, it is understood that a perovskite-type composite metal oxide was carried in the internal pore structure of the porous silica carrier, as particles having a particle size of about 2 to 3 nm. Note that, HAADF-STEM forms an image by the scattering phenomenon of electron beams, which is caused in proportion to the square of the element mass.

Evaluation of Characteristics of Oxygen Removal and Hydrogen Generation

The redox materials of Examples 1 to 5 were respectively heated in a nitrogen atmosphere up to 1000° C. to cause oxygen removal, and then were heated up to 800° C. in a steam atmosphere to cause hydrogen generation. The obtained results are shown in Table 1. Note that, in Table 1, the amounts of oxygen removal and hydrogen generation are shown with respect to the mass of the redox metal oxides such as perovskite-type composite metal oxides (μmol/g-redox metal oxide).

From Table 1, it will be understood that, in comparison with the redox materials of Comparative Examples 1 and 2, the redox materials of Examples 1 to 5 exhibit excellent thermochemical water splitting characteristics even at a low temperature.

While the invention has been described with reference to specific embodiments chosen for purpose of illustration, it should be apparent that numerous modifications could be made thereto by those skilled in the art without departing from the basic concept and scope of the invention.

The invention claimed is:

1. A redox material for thermochemical water splitting, comprising;
   a redox metal oxide selected from the group consisting of fluorite-type composite metal oxides and combinations of fluorite-structured composite metal oxides and perovskite-structured composite metal oxides; and
   a metal oxide carrier,
      wherein said redox metal oxide is carried on said metal oxide carrier in a dispersed state,
      said metal oxide carrier is a porous silica carrier comprised of silica having an internal pore structure, and said redox metal oxide is carried in the internal pore structure of said porous silica carrier, and
      in the distribution of pores of said porous silica carrier, a peak derived from the gaps between primary particles of silica is in the range of 3 to 100 nm.

2. The redox material according to claim 1, wherein said redox metal oxide has an average particle size of 20 nm or less and is carried on said metal oxide carrier in a dispersed state.

3. The redox material according to claim 1, wherein said peak derived from the gaps between primary particles of silica is in the range of 5 to 50 nm.

4. The redox material according to claim 1, wherein, in the distribution of pores of said porous silica carrier, a peak derived from the internal pore structure of silica is in the range of 1 to 5 nm.

5. The redox material according to claim 1, wherein said perovskite-structured composite metal oxide and/or fluorite-structured composite metal oxide are composite metal oxides of a rare earth and transition metal.

6. A method for producing hydrogen by thermochemical water splitting, comprising
   (a) heating a redox material according to claim 1 comprising a high oxidation-state redox metal oxide to remove oxygen from the high oxidation-state redox metal oxide, and thereby obtain a redox material comprising a low oxidation-state redox metal oxide, and oxygen; and
   (b) bringing the redox material comprising the low oxidation-state redox metal oxide into contact with water to oxidize the low oxidation-state redox metal oxide and reduce the water, and thereby obtain the redox material comprising the high oxidation-state redox metal oxide, and hydrogen.

7. The method according to claim 6, in said step (a), said redox material is heated to a temperature of 1300° C. or less to obtain said redox material comprising the low oxidation-state redox metal oxide, and oxygen.

8. The method according to claim 6, in said step (b), said redox material is reacted with water at a temperature of 1100° C. or less to obtain said redox material comprising the high oxidation-state redox metal oxide, and hydrogen.

* * * * *